Patented Feb. 10, 1931

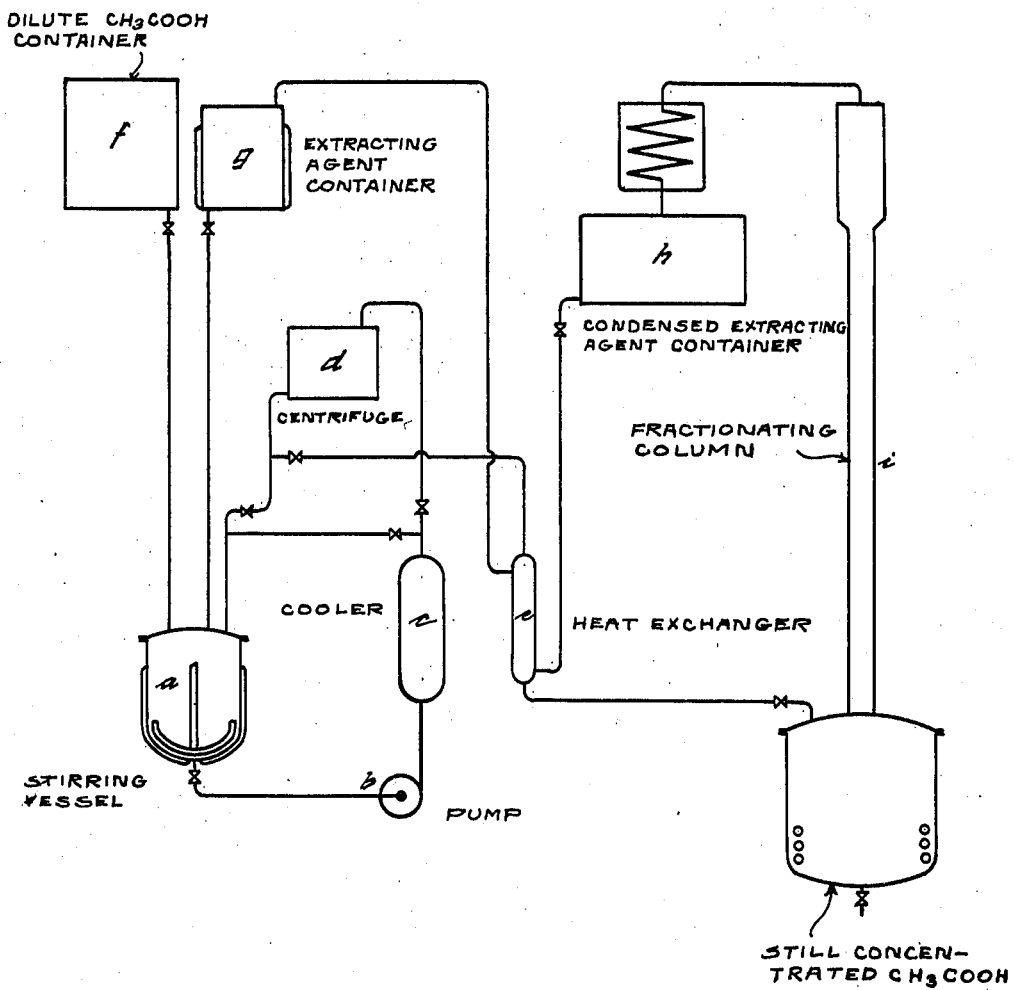

1,792,113

UNITED STATES PATENT OFFICE

MARTIN MUGDAN AND JOSEF WIMMER, OF MUNICH, GERMANY, ASSIGNORS TO CONSORTIUM FÜR ELEKTROCHEMISCHE INDUSTRIE, G. M. B. H., OF MUNICH, GERMANY, A CORPORATION OF GERMANY

PROCESS FOR OBTAINING CONCENTRATED ACETIC ACID

Application filed March 9, 1929, Serial No. 345,814, and in Germany March 19, 1928.

It is known that glacial acetic acid can be obtained from aqueous acetic acid by repeated extraction of the latter by means of an organic solvent (compare E. Galitzenstein, Zeitschrift f. angew. Chemie 29, page 148). For this process chlorinated hydrocarbons are advantageously used as the extracting agent. The disadvantage of the process is that the distribution equilibrium between the acetic acid solution and extracting agent is either very unfavourable, so that repeated extractions and in consequence a large quantity of extracting agent are necessary in order to extract the acetic acid thoroughly, or large quantities of water are dissolved together with the acetic acid by the extracting agent, so that highly concentrated acetic acid cannot be obtained.

The present invention relates to a process by which in a single extraction the whole of the acetic acid is extracted by a comparatively small proportion of solvent and at the same time the whole of the water is separated in the form of ice free from acetic acid. For this purpose, the dilute acetic acid in presence of a solvent for acetic acid is cooled to a very low temperature, at least as low as −20° C. and advantageously to the freezing point of the eutectic composed of acetic acid and water, namely about −27° C. The acetic acid is separated from the water by any solvent for acetic acid, when the extraction is conducted at the said low temperature, better than when it is conducted at the ordinary temperature. Preferred solvents are those which, while they have a sufficient solubility for acetic acid, have a low solvent power for water, for instance chlorinated hydrocarbons, in particular dichlorethylene, trichlorethylene, dichlormethane or tetra chlorethane, and esters, particularly acetic acid esters, and acetone oil or the like. Mixtures of solvents, for instance ethylacetate and a hydrocarbon or a chlorinated hydrocarbon may also be used.

Example 1000 parts by weight of acetic acid of 40 per cent. strength are thoroughly mixed with 1200 parts of dichlorethylene while cooling to about −27° C. until no more ice separates. The water is then in the form of ice free from acetic acid, while the acetic acid is in solution in the dichlorethylene with only a very small proportion of water. The ice is separated from the extract in a centrifuge, filter-press or like device, sufficiently protected against access of heat, and is washed free from acetic acid by means of dichlorethylene cooled to a low temperature. The ice and cold extract are used for pre-cooling further quantities of acetic acid and solvent or for cooling the condenser of a freezing machine. Other known solvents or mixtures of solvents for acetic acid may be used instead of dichlorethylene with good result. Obviously, the proportion of solvent must be selected with a view to its capacity for dissolving acetic acid at the low temperature.

By distilling the solvent from the acetic acid or the acetic acid from the solvent (when the latter has the higher boiling point) the acetic acid is obtained as glacial acetic acid. During this fractional distillation the small proportion of water present in the extract passes over in the first runnings.

In order to prevent formation of ice on the cooling surfaces of the extraction apparatus whereby transmission of heat and the transformation of the ice in the filtering devices are affected, the process is advantageously conducted in such a manner that the solvent, which is kept in constant movement, is first cooled to a temperature below −27° C. and is then gradually mixed with the pre-cooled dilute acetic acid, while maintaining the temperature at the said degree. In this case the ice does not separate on the cooling surfaces themselves but within the extracting agent.

The accompanying diagram illustrates how the process may be practised. $a$ is a stirring vessel having a cooling jacket. $b$ is a pump. $c$ is a low temperature cooler. $d$ is a centrifuge or other separating device. $e$ is a heat exchange device. $f, g$ and $h$ are containing vessels.

All these apparatus are protected against loss of cold.

$i$ is a fractionating apparatus.

The extracting agent contained in $g$ is run into $a$ and is circulated by means of pump $b$ through the cooler $c$ until its temperature is below $-26°$ C. While maintaining this temperature, the dilute acetic acid is gradually added from the container $f$, so that the temperature does not rise above $-25°$ C. When this final condition has been attained, the centrifuge $d$ is brought into the circuit and the contents of $a$ are pumped into it through the cooler $c$. The separated liquid is allowed to flow from the centrifuge through heat exchange device $e$, where it cools the already fractionally distilled dichlorethylene which is free from acetic acid and then flows into the fractionating apparatus, where the dichlorethylene is separated from the acetic acid. The dichlorethylene which has been cooled to a low temperature is first used for washing out the contents of the centrifuge. The ice charged with the solvent is most suitably melted in the centrifuge itself, and its coldness can be utilized anew, for example, by circulating pure solvent through the centrifuge and along the condenser of a refrigerating machine, thereby transferring the warmth of the latter to the ice, which is thus melted. Or else, the centrifuge may be cleared of the ice, and the coldness of the latter otherwise employed.

The solvent contained in the water can be separated from it by distillation, most conveniently—in order to economize warmth—in a vacuum, and, in this case, the solvent should be preferably condensed after having passed through the vacuum-pump. Or else, the solvent can be separated from the water by extracting it through the agency of another solvent which has a higher or lower boiling-point. Furthermore it is possible to employ, in the place of fresh water, the water containing the solvent at that stage of the process involving the dilution of the acetic acid (e. g. for the precipitation of cellulose-acetate). If the diluted acetic acid still contains mineral acids, the latter can best be neutralized before they are submitted to the process herein described by alkali acetate or alkali carbonate.

What we claim is:

1. A process for obtaining concentrated acetic acid from aqueous acetic acid by an extraction operation wherein the aqueous acetic acid is treated with a solvent for acetic acid at below minus 20° C.

2. A process for obtaining concentrated acetic acid from aqueous acetic acid by an extraction operation wherein the aqueous acetic acid is treated with a solvent for acetic acid at below minus 26° C.

3. A process for obtaining concentrated acetic acid from aqueous acetic acid by an extraction operation wherein the aqueous acetic acid is treated with solvents containing chlorinated hydrocarbons at below minus 20° C.

4. A process for obtaining concentrated acetic acid from aqueous acetic acid by an extraction operation wherein the aqueous acetic acid is treated with solvents containing chlorinated hydrocarbons at below minus 26° C.

5. A process for obtaining concentrated acetic acid from aqueous acetic acid by an extraction operation wherein the aqueous acetic acid is treated with chlorinated hydrocarbons at below minus 20° C.

6. A process for obtaining concentrated acetic acid from aqueous acetic acid by an extraction operation wherein the aqueous acetic acid is treated with chlorinated hydrocarbons at below minus 26° C.

7. A process for obtaining concentrated acetic acid from aqueous acetic acid by an extraction operation wherein the aqueous acetic acid is treated with dichlorethylene at below minus 20° C.

8. A process for obtaining concentrated acetic acid from aqueous acetic acid by an extraction operation wherein the aqueous acetic acid is treated with dichlorethylene at below minus 26° C.

9. A process for obtaining concentrated acetic acid from aqueous acetic acid by an extraction operation wherein the solvent is cooled to below minus 20° C., and diluted acetic acid is added gradually, the liquid being constantly kept in motion and the low temperature maintained.

10. A process for obtaining concentrated acetic acid from aqueous acetic acid by an extraction operation wherein the solvent is cooled to below minus 26° C., and diluted acetic acid is added gradually, the liquid being constantly kept in motion and the low temperature maintained.

MARTIN MUGDAN.
JOSEF WIMMER.